Feb. 6, 1962   J. J. KEYSER   3,019,589
BRAKE FOR SPINNING AND TWISTING SPINDLES
Filed July 21, 1961
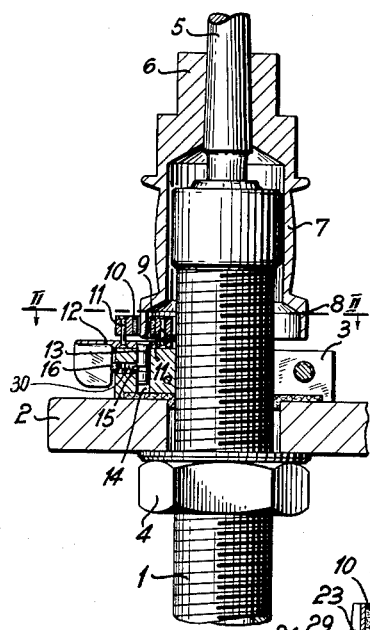
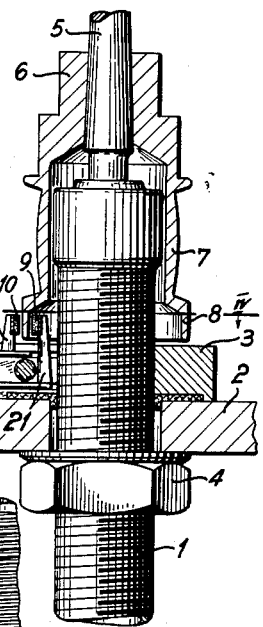
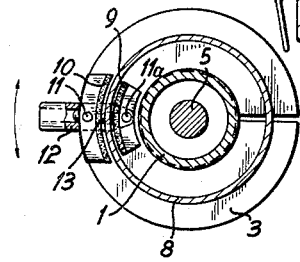
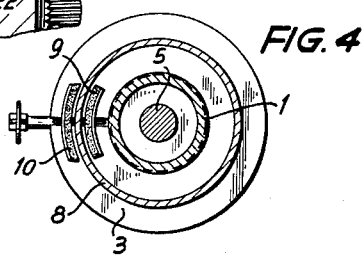

United States Patent Office 3,019,589
Patented Feb. 6, 1962

3,019,589
BRAKE FOR SPINNING AND TWISTING
SPINDLES
Johann Jacob Keyser, Grabenallee 16,
Aarau, Switzerland
Filed July 21, 1961, Ser. No. 125,811
Claims priority, application Germany July 30, 1960
5 Claims. (Cl. 57—88)

The present invention relates to a brake for spinning and twisting spindles with brake shoes adapted to engage an inner or an outer surface of the whorl.

The heretofore known brakes for spinning or twisting spindles generally comprise a single brake shoe which in most instances engages from the outside a surface of the whorl in order to bring about the desired braking effect.

The engagement of a portion of the outer circumference by a single brake shoe brings about the drawback that the upper portion of the spindle is unilaterally pressed. This drawback becomes all the more important the greater the dimensions are of the cop on the spindle and therefore the weight of the cop.

Inner brake shoes likewise operating by means of a single brake shoe have the same drawbacks as mentioned above.

The heretofore known inner brake shoe brakes having circumferentially distributed a plurality of brake segments are able considerably to improve the pressure conditions prevailing when employing a single brake shoe only, but this is possible only when the braking effect is evenly distributed over all segments. This, however, is rather difficult to realize.

In view of the continuous efforts and requirements to increase the body of the cop and to increase the spindle speed, a spindle can by means of the heretofore known brakes reliably be braked only with the above mentioned drawbacks. In addition thereto, the braking of greater forces will naturally bring about a faster wear of the brake lining and, when employing a worn off brake lining, there is, of course, the danger that the corresponding brake surfaces of the spindle whorl wear easily and quickly.

It is, therefore, an object of the present invention to provide a brake for spinning or twisting spindles which will overcome the above mentioned drawbacks.

It is a further object of this invention to provide a brake for spinning or twisting spindles which will make possible a proper braking effect in spite of an increase in the weight of the yarn body and in the speed of the spindle, without risking any undue wear of the spindle or brake lining.

It is a further object of this invention to provide a multi-brake shoe brake, in which the brake shoes will for all practical purposes be actuated simultaneously and uniformly.

These and other objects and advantages of the invention will appear more clearly from the following specification in connection with the accompanying drawings, in which:

FIG. 1 represents a portion, partly in section, of a spindle with a brake according to the present invention.

FIG. 2 is a cross section taken along the line II—II of FIG. 1 viewing the brake from the top.

FIG. 3 illustrates a portion, partly in section, of a spindle with a modified brake according to the present invention.

FIG. 4 is a cross section taken along the line IV—IV of FIG. 3 viewing the brake from the top.

FIG. 5 is a further portion of a modified brake according to the present invention.

The arrangement according to the present invention is characterized primarily in that a brake shoe adapted to become effective from the inside of the whorl is located radially oppositely to a brake shoe adapted to become effective from the outside of the whorl. Both brake shoes are actuated simultaneously by a plier-like actuating mechanism.

The actuating mechanism may be designed in various manner. According to one embodiment, the radially oppositely located brake shoes may be linked to a lever which is horizontally tiltable about a vertical shaft the tilting axis of which is at least movable radially with regard to the spindle axis.

According to another embodiment of the invention, the two oppositely located brake shoes are linked to radially outwardly extending slides the free ends of which are interconnected by a tiltable lever. Preferably, the arrangement is such that the slides are located one upon the other and are interconnected by a vertically extending tilting lever.

Both embodiments will assure that the braking action may be carried out by means of the tilting lever as the only actuating lever while the plier-like actuation of the two brake shoes will occur uniformly so that the upper portion of the spindle cannot be pressed away. The simultaneous actuation of the two brake shoes is assured by the plier effect because with a plier the actuation of one shoe will depend on the simultaneous actuation of the other shoe.

A brake according to the present invention may simultaneously serve as safety device against the lifting off of the spindle upper portion. To this end, the invention provides that the lower marginal portion of the whorl protrudes in a manner known per se radially inwardly and/or outwardly while the brake shoes extend over the protruding marginal portion and act as axial spindle safety divice. This preferred arrangement has the great advantage that a separate safety arrangement against lifting off of the spindle upper portion will be superfluous.

Referring now to the drawings in detail, all embodiments shown therein have a spindle which in a manner known per se comprises a lower portion 1 which is connected to a spindle rail 2 by means of a flange 3 resting on said spindle rail 2, and by means of a nut 4 threadedly engaging the lower portion 1 of the spindle below said spindle rail 2. Inserted into the spindle lower portion 1 is the spindle shank 5 which is connected to the spindle upper portion 6. The lower end of the spindle upper portion 6 is provided with a whorl 7 the lower marginal portion 8 of which is bell-shaped.

In conformity with the present invention, all embodiments comprise an inner brake shoe 9 adapted to be effective from the inside of the whorl 7, and an outer brake shoe 10 which is radially oppositely located to the inner brake shoe 9 for engaging an outer surface portion of the whorl portion 8. The actuation of the inner and outer brake shoes is effected simultaneously by a plier-like actuating mechanism to be described further below.

According to the embodiment shown in FIGS. 1 and 2, the inner brake shoe 9 and the outer brake shoe 10 are respectively linked to a shift lever 12 by means of pivots 11, 11a which extend in vertical direction through the corresponding brake shoes. The shift lever 12 is tiltable in a horizontal plane about a vertical pivot 13. Pivot 13 is inserted into a bore 14 in flange 3. The center point of said bore 14 is located below the mean diameter of the bell-shaped lower end 8 of whorl 7 in flange 3. Preferably, the pivot 13 is not determined by a bore precisely corresponding to the diameter of said pivot but it is preferred either in flange 3 or in shift lever 12 to provide a bore which increases radially with regard to the spindle axis in order to obtain a certain play. The pivot 13 may be assured against axial displacement for instance by a ball 15 engaging an annular groove in pivot 13, said ball being urged into said groove by a spring 30. In this way, the tiltability of the shift lever 12 about pin or pivot 13 will be maintained. In addition thereto, a second ball 16 may be provided at that end of spring 30 which is located opposite to that spring end which engages ball 15. This arrangement will assure the central position of the shift lever 12 and, if desired, will define the end positions of said shift lever if the shift lever 12 is provided with corresponding depressions for engagement by ball 16.

If it is desired to brake the spindle shank 5 with the spindle upper portion 6 and the cop (not illustrated) on the spindle upper portion 6, the shift lever 12 is tilted about its pivot 13. The tilting movement may be effected in clockwise direction as well as in counter-clockwise direction. In both instances, the tilting of shift lever 12 will bring about a simultaneous movement of the inner brake shoe 9 and the outer brake shoe 10, which are linked to lever 12, in the direction toward the corresponding surface of the bell-shaped lower marginal portion 8 so that a simultaneous actuation of both brake shoes 9 and 10 will be effected until the same engage the respective surfaces of the marginal portion 8, thereby braking and stopping the spindle upper portion 6 with the cop thereon. In order to allow again rotation of the spindle upper portion 6, the shift lever 12 will be moved in a direction opposite to the preceding movement into a central position in which the two brake shoes 9 and 10 are out of engagement with the surfaces of the lower marginal portion 8. The shift lever 12 will be held in its central position for instance by the spring-urged ball 16.

With the embodiment according to FIGS. 3 and 4, the inner brake shoe 9 supported by the member 21 is fitted to a radially outwardly extending slide 22. The outer brake shoe 10 with its supporting member 23 therefor is fitted to a radially outwardly extending slide 24. The two slides 22 and 24 are arranged in vertically superimposed manner preferably in a slot or flange 3, and have their outer ends 22', 24' respectively mounted on a shift lever 25 extending in vertical direction. When flange 3 is designed as clamping flange, the clamping slot thereof may simultaneously be employed for receiving the supporting members and slides 21, 22 and 23, 24. In both instances, at least one of the slides may be spring-urged, the spring being adapted to hold the slide in its open position when the brake is not engaged.

When moving the shift lever 25 in the direction toward the spindle, simultaneously the inner brake shoe 9 and the outer brake shoe 10 are moved in the direction toward the corresponding adjacent surfaces of the bell-shaped lower marginal portion 8 of the whorl 7 so that a simultaneous contact of the corresponding surfaces with the two brake shoes will occur thereby braking the upper portion 6 of the spindle. Also in this instance, a plier-like feeding and clamping is effected which will prevent the spindle upper portion 6 from being unilaterally pressed away. When releasing the shift lever 25, the two brake shoes 9 and 10 will disengage the corresponding surfaces of the lower marginal portion 8 so that the spindle upper portion 6 with the cop thereon will be driven by the driving belt looped around the whorl 7. While the shift lever 25 shown in FIG. 3 in solid lines extends upwardly it is, of course, to be understood that the lever could of also extend downwardly as indicated in dash lines. In the last mentioned instance, the braking effect will be obtained by pulling the shift lever 25. If desired, the shift lever may also be designed as double lever.

The embodiment illustrated in FIG. 5 is generally of the same design as the embodiment of FIGS. 3 and 4. The brake shoe 9 is likewise linked by means of a supporting member 21 to a radially extending slide 22, and the outer brake shoe 10 is linked to a slide 24 by means of supporting member 23. The free ends 22' and 24' of the slides 22 and 24 respectively are, in this instance, mounted on a vertically downwardly extending shift lever 26 which is tiltable between the free ends 22' and 24' about the pivot 27. The pivot 27 is supported by a support 28 connected to flange 3. This design is characterized primarily in that the bell-shaped lower marginal portion 8 of the whorl 7 has its lower edge provided with a radially extending web 29. This web 29 may protrude either inwardly or outwardly or in both directions. In each instance, the web 29 forms a safety means which will prevent the spindle upper portion 6 from being lifted off as soon as the inner brake shoe 9 and the outer brake shoe 10 are in braking position or at least partially extend beyond web 29. This embodiment is particularly advantageous because no other parts will be necessary as safety device against lifting off of the spindle upper portion 6. If, however, the spindle upper portion 6 is to be lifted off, the two brake shoes 9 and 10 are moved into a position beyond their normal disengaging position. This may be effected for instance by subjecting the shift lever 26 to such a pressure that between the two brake shoes 9 and 10 there will be sufficient free space for passing of the web 29 therethrough.

A brake according to the present invention, particularly the simultaneous engagement of the brake shoes on the outer and inner surface of the spindle whorl, has the important advantage that the spindle upper portion cannot be pressed off while a sufficient braking effect will always be assured. Due to the fact that with the brake according to the present invention no longer a unilateral frictional engagement of the brake shoe will be effected, but instead on similar portions of the whorl a simultaneous engagement will occur on the inside as well as on the outside of the respective bell-shaped surface of the whorl, a quicker and more effective braking than heretofore possible will be obtained. In addition thereto, an easier stopping of the brake spindle will be assured in view of the automatic clamping effect of the brake shoes arranged opposite to each other.

The distribution of the braking forces to be produced over two brake shoes will considerably reduce the wear of the corresponding brake shoes and of the corresponding whorl surfaces. In view of the plier-like design of the feeding mechanism for the brake shoes, the two brake shoes will automatically be aligned with regard to each other so that the braking engagement will actually be effected at the same time and to the same degree, even if a certain wear of both or one of the brake shoes should have taken place. For this reason, also an increase in the weight of the cop or an increase in the spindle speed will not materially affect the good braking action of the brake according to the present invention.

It is, of course, to be understood that the present invention is, by no means, limited to the particular constructions shown in the drawing but also comprises any modifications within the scope of the appended claims. Thus, a brake according to the embodiments of the invention may by a corresponding change of the individual parts be employed for all spindles having braking surfaces of the type somewhat similar to the bell-shaped marginal portion 8. The size of the spindle and of the cop will not be material in this connection because the design of the brake shoes may be effected correspondingly.

What I claim is:

1. In combination with a textile machine spindle having an annular rotatable portion with an inner braking surface and an outer braking surface, an inner braking member arranged within said annular portion for selective engagement with said inner braking surface, an outer braking member arranged substantially radially opposite to said inner braking member adjacent to and on the outside of said annular portion for selective braking engagement with said outer braking surface, and control lever means having said inner and outer braking members linked thereto and being operable to simultaneously bring said inner and outer braking members into braking engagement with said inner and outer braking surface respectively.

2. In combination with a textile machine spindle having an annular rotatable portion with an inner braking surface and an outer braking surface, an inner braking member arranged within said annular portion for selective engagement with said inner braking surface, an outer braking member arranged substantially radially opposite to said inner braking member adjacent to and on the outside of said annular portion for selective braking engagement with said outer braking surface, a control lever, stationary supporting means, pivot means supported by said supporting means for pivotally supporting said control lever so as to allow shifting movement of said control lever in a plane substantially perpendicular to the axis of said spindle, said pivot means being movable to a limited extent in at least the radial direction with regard to the axis of said spindle. And additional pivot means extending substantially perpendicular to the plane of movement of said control lever and respectively pivotally connecting said inner and outer braking members to said control lever.

3. In combination with a textile machine spindle having an annular rotatable portion with an inner braking surface and an outer braking surface, an inner braking member arranged within said annular portion for selective engagement with said inner braking surface, an outer braking member arranged substantially radially opposite to said inner braking member adjacent to and on the outside of said annular portion for selective braking engagement with said outer braking surface, a pair of sliding members movable in radial direction with regard to the axis of rotation of said rotatable portion, shiftable lever means having spaced portions thereof pivotally connected to one end of each of said sliding members, and means respectively pivotally connecting said inner and outer braking members to said sliding members for selectively and simultaneously causing said braking members to respectively engage said inner and outer braking surfaces.

4. An arrangement according to claim 3, in which said sliding members are arranged in vertically spaced relationship to each other, and in which said shiftable lever means interconnects said sliding members at points located in a substantially vertical plane.

5. In combination with a textile machine spindle having a whorl with a downwardly extending annular skirt portion having its lower end portion provided with a radially extending portion, said skirt portion having an inner and an outer braking surface, an inner braking member arranged within said skirt portion for selective engagement with said inner braking surface, an outer braking member arranged substantially radially opposite to said inner braking member adjacent to and on the outside of said skirt portion for selective braking engagement with said outer braking surface, at least one of said braking members having an extension extending above said radially extending portion when said last mentioned braking member is in its braking surface engaging position, and control lever means having said inner and outer braking members linked thereto and being operable selectively to simultaneously bring said inner and outer braking members into braking engagement with said inner and outer braking surface respectively.

References Cited in the file of this patent
UNITED STATES PATENTS 2,966,025    Grundler _____ Dec. 27, 1960

FOREIGN PATENTS 622,885    Great Britain _____ May 9, 1949